United States Patent [19]

Oweis et al.

[11] Patent Number: 5,578,394
[45] Date of Patent: Nov. 26, 1996

[54] SEAL ASSEMBLY FOR HIGH TEMPERATURE BIPOLAR LI ALLOY METAL SULFIDE BATTERY

[75] Inventors: Salah M. Oweis, Ellicott City, Md.; James G. Snyder, Hanover, Pa.; Louis A. D'Ussel, Towson, Md.

[73] Assignee: Saft America, Inc., Valdosta, Ga.

[21] Appl. No.: 602,005

[22] Filed: Feb. 15, 1996

[51] Int. Cl.[6] ........................................ H01M 6/48
[52] U.S. Cl. .......................... 429/155; 429/185; 429/210; 429/245
[58] Field of Search ...................................... 429/103, 104, 429/149, 152, 154, 155, 174, 185, 210, 245

[56] References Cited

U.S. PATENT DOCUMENTS

| 4,037,027 | 7/1977 | Desplanches et al. . | |
|---|---|---|---|
| 4,049,889 | 9/1977 | Heintz . | |
| 4,061,841 | 12/1977 | Sharma et al. . | |
| 4,687,717 | 8/1987 | Kaun et al. ............................. | 429/152 |
| 5,162,172 | 11/1992 | Kaun . | |
| 5,279,909 | 1/1994 | Horner et al. . | |
| 5,411,818 | 5/1995 | Barlow et al. ........................ | 429/210 X |

Primary Examiner—Anthony Skapars
Attorney, Agent, or Firm—Sughrue, Mion, Zinn, Macpeak & Seas

[57] ABSTRACT

Flanged U-shaped cup members abut the exterior of the negative electrode and positive electrode of a Li alloy/FeS$_x$ multi-cell battery array and function to form a peripherally sealed structural enclosure for these elements, while capturing and maintaining ceramic seal rings between respective flanges. The flanged cup-like members act in conjunction with either back-to-back similarly shaped and sized inverted flanged cup-like members or C-shaped upper and lower spacer rings whose vertical height is double that of the electrodes. At least one of the flanges of the electrode containment structure extends radially outwardly and downwardly oblique from the other flange of the C-shaped support structure, and the periphery thereof is welded to the periphery of a similar diameter juxtaposed cell cover ring to form a complete multi-cell envelope for the battery by welding of two seal assemblies together.

8 Claims, 2 Drawing Sheets

5,578,394

SEAL ASSEMBLY FOR HIGH TEMPERATURE BIPOLAR LI ALLOY METAL SULFIDE BATTERY

FIELD OF THE INVENTION

This invention is to electrochemical cell and battery enclosures, and more particularly to a compact, multiple cell bipolar battery in which plural cell assemblies are hermetically sealed utilizing components having compatible thermal expansion coefficients utilizing both thermocompression and solid diffusing bonding between components in a single operation using the same equipment and subjecting a stacked assembly to pressure and high temperature to effect the same.

BACKGROUND OF THE INVENTION

Thermocompression techniques have been employed in the past for effecting a seal between a metallic container and an $\alpha$-alumina ring for sodium-sulphur high temperature cell as exemplified by U.S. Pat. No. 4,037,027 to Desplanches et al. However, the technique and materials disclosed are not effective for lithium-based cells. The peripheral seals create a container or envelope for the cell electrochemistry and permits bipolar stacks of plural cells to be effected in a one-shot operation. Such peripheral seals must be a good electrical insulator at cell operating temperatures on the order of 400° to 500° C., the peripheral seal structure must be chemically stable at such high temperature, must involve a match of thermal expansion coefficients for the components of the cells, provide a strong mechanical bond to metals and/or ceramics and provide an effective barrier to molten salt.

U.S. Pat. No. 5,279,909 to Horner et al. is directed to a compact bipolar battery cell which includes extremely thin metal-ceramic metal seals which is used to electrically insulate the battery's anode current collector from its cathode current collector with the seals preventing leakage of the battery's electrolyte from between the anode and cathode, and wherein the seals are made from layers of powder which are sintered together in a monolithic structure.

U.S. Pat. No. 5,162,172 to Kaun is directed to the production of bipolar batteries of a plurality of cells which are sealed at their peripheries and which employ cup-like electrode holders open at the top to receive individual elements such as the negative and positive electrodes, the separator element, etc., and which includes perimeter metallic seal rings and ceramic seal rings to complete an electrode containment structure.

Such bipolar batteries as exemplified by Horner et al. and Kaun are either complicated in structure and require individual peripheral seals as each level of the stacked array is completed utilizing the cup-shaped holders in order from the bottom of the stack to the top as in Kaun, or simultaneous sintering of a multi-layer stacked structure of compressed ceramic and metallic powders, thereby requiring close control of the material content of the ceramic/metallic constituents of the sintered multi-layer structure.

It is therefore a primary object of this invention to provide a compact, hermetically peripherally sealed bipolar multi-cell alloy/$FeS_x$ battery which utilizes specially formed and configured spacer rings in conjunction with like thermal coefficient of expansion current collector cups, allowing easier and more economically constructed peripherally sealed modular units, eliminating the need for electrode locators, and permitting steel-to-steel welding to hermetically close the cell envelope of at least two seal assemblies, and where peripheral sealing between juxtaposed components is effected by thermocompression and diffusion bonds.

SUMMARY OF THE INVENTION

The present invention resides in an improved compact bipolar battery cell of the stacked array type comprised of a negative electrode, a positive electrode and separator element. The separator element is disposed between the negative electrode and the positive electrode, with one of the separator and the electrodes containing an electrolyte in an electrode containment structure. The electrode containment structure comprises, in order, a first upwardly open, flanged current collector cup supporting and containing the positive electrode. A first spacer ring sized to the current collector cup and having an annular wall of a diameter on the order of the diameter of the current collector cup has upper and lower flanges, with the upper flange being diffusion bonded to the outer surface of the current collector cup and the lower flange extending obliquely downwardly and outwardly. A ceramic seal ring is sized to and thermocompression bonded to the flange of the first upwardly open flanged current collector cup and surrounds the separator. A first metal cell cover ring is sized to and compression bonded to the upper surface of the ceramic seal ring thereby completing a lower cell seal assembly.

A second, upwardly open, flanged current collector cup overlies the negative electrode and has a flange thereof extending radially outwardly of and at some distance above the negative electrode. A second spacer ring has an annular wall terminating in upper and lower flanges which extend radially therefrom and with the annular wall sized to the outer diameter of the negative electrode having at least the upper flange thereof diffusion bonded to the second current collector cup with a lower flange thereof extending obliquely outwardly and downwardly from said annular wall. A second ceramic seal ring is sized to and thermocompression bonded to the upper surface of said second current collector cup flange, and a second metal cell cover ring is sized to and thermocompression bonded to the upper face of said ceramic seal ring, completing an upper cell seal assembly, thereby permitting the stacked array to be maintained under compression and subjected to a temperature capable of effecting both thermocompression and diffusion bonds between said components of the stacked array. The second spacer ring lower flange is hermetically welded, at the outer periphery thereof, to the outer periphery of the first cell cover ring. The multi-cell structure utilizes the oblique lower flanges of the spacer rings to assist in applying the stacked pressure and subsequently to allow expansion and contraction of the cell chemistry during cell cycling operation and permitting metal-to-metal welding to hermetically close the cell envelope.

The spacer rings may be of C-shape with an annular inner wall of a height in excess of the negative and positive electrodes, or of C-shape with the upper flange of the spacer ring welded to the bottom of the respective first and second flange upwardly open cup-like electrode holders.

BRIEF DESCRIPTION OF THE DRAWINGS

The invention will be more clearly understood from the following description in conjunction with the accompanying drawings, in which.

DESCRIPTION OF THE PREFERRED EMBODIMENTS

Figure 1:
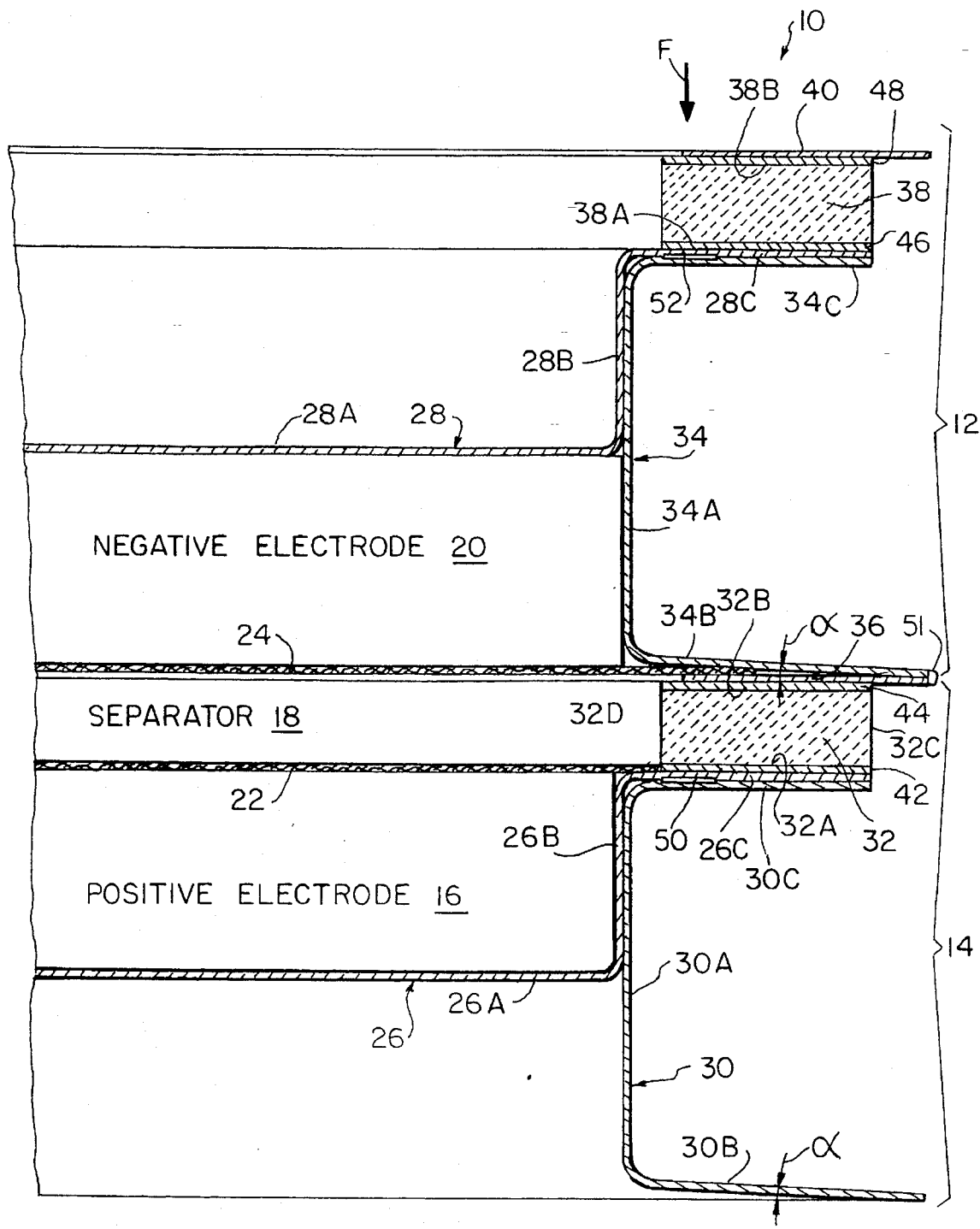
FIG. 1 is a cross-sectional view of a portion of a hermetically sealed thermocompression/diffusion bonded hermetically sealed bipolar Li alloy/FeS$_x$ battery having a plurality of cells in the form of two welded seal assemblies and forming a preferred embodiment of the present invention.

Reference first to FIG. 1, a high temperature bipolar Li alloy metal sulfide battery incorporating the hermetically sealed peripheral seal of the present invention and forming a preferred embodiment is illustrated generally at 10 and consists of an seal assembly 12 peripherally welded to a lower seal assembly 14 to effect a hermetically sealed, peripheral seal high temperature bipolar Li alloy/FeS$_x$ battery 10. In conventional fashion, the internal chemistry of the battery is formed by a vertically stacked array of an underlying positive electrode 16, a separator 18, a negative electrode 20 with the separator 18 being separated therefrom and the two electrodes 16, 20 by a pair of electrode particle screens 22, 24. The screens are of larger diameter than the electrode separator and negative electrode. The battery is of pancake form, being of cylindrical configuration typical of bipolar Li alloy/FeS$_x$ battery cells. This content of the battery 10 is quite conventional, as are some of the components making up the hermetic seal and support structure for seal assemblies 12 and 14. The invention is partially predicated upon the utilization of outwardly flanged, upwardly open current collector cups such as that at 26 for disposition and support of the positive electrode 16 and that indicated generally at 28 for the negative electrode 20. The negative electrode is not mounted within the upwardly open cup-shaped current collector 28. The battery therefor consists of a stacked array, a part of which is at the periphery to facilitate the stacking, positioning and mechanical connection and seal for all of the components making up battery 10. At the bottom of the stack and radially exterior of the positive electrode is the lower or first C-shaped spacer ring 30. The C-shaped spacer rings form highly rigid support and seal members. The lower current collector cup 26 is of U-shape form including a flat base 26A, a vertically upright annular wall 26B and an integral radially outwardly extending right angle flange 26C. The inside diameter of the annular wall 26B matches or closely approximates the outer diameter of the disk form positive electrode 16. Further, the vertical height of the annular wall 26B essentially matches the vertical height of the positive electrode 16. The lower or first spacer ring 30 is of C-shaped cross-section having a relatively large height annular wall 30A terminating in an integral lower flange 30B which extends outwardly therefrom and downwardly at a slight angle α, whose purpose and function will be described hereinafter. The upper flange 30C is at right angles to the annular wall 30A. As may be appreciated, the use of a spacer ring for each seal assembly 12, 14 is a major element of the invention and performs a number of purposes. Mounted on the upper surface of flange 30C is a ceramic ring 32 which is narrower than the width of the flange 30C and which preferably has its outer periphery aligned with the outer periphery of flange 30C. The ceramic ring 32 is interposed between the flange 26C of the lower current collector cup 26. The lower cell cover ring 32 has its inner periphery 32D abutting the outer periphery of the separator 18 and is essentially of the same thickness as the separator. A further aspect of the present invention is the fact that this lower ceramic ring is thermocompression bonded on its lower face to the upper surface of the lower current collector cup flange 26C, while its upper surface 32B is thermocompression bonded to the lower surface of the lower cell cover ring 36.

Components 30, 26, 32 and 36 form the principal elements of seal assembly 14.

A similar array of elements is provided for the upper seal assembly 12, the lowermost of which is an upper or second spacer ring 34 of C-shaped cross-section having a vertical annular wall 34A which is approximately twice the vertical height of the negative electrode 20 and which abuts the negative electrode 20 over its lower half. The integral lower flange 34B of the upper spacer ring is likewise downwardly angularly oblique through an angle α identical to that for the lower spacer ring 30 and is essentially identical to that ring. The upper flange 34C of the upper spacer ring is at right angles to the annular wall 34 and projects radially outwardly therefrom. The upper current collector cup 28 is of similar size and configuration to the lower current collector cup 26, both preferably formed or molybdenum (MO). It is comprised of a flat base 28A, a right angle annular vertical wall 28B, and a radially outwardly projecting flange 28C. An upper ceramic ring 38 mounts and is thermocompression bonded to the upper current collector cup flange 28C via its lower face 38A, while the upper face 38B of that ceramic ring is thermocompression bonded to the upper cell cover ring 40. As may be appreciated, while only two seal assemblies 12 and 14 are shown making up the battery 10, the battery could consist of three or more such seal assemblies as a stacked array connected electrically in series to provide an appropriate electrical voltage. While the cell cover rings 36, 40 are bonded to the upper surfaces of ceramic rings 32, 38 with their lower surfaces thermocompression bonded to respective current collector cups 26, 28, the present invention is particularly directed to effecting a solid metal diffusion bonding between the like material current cups 26, 28 and the lower and upper spacer rings 30, 34. In terms of material content, the cell cover rings 36, 40 and the spacer rings 30, 34 are preferably made of stainless steel (SS) or mild steel. As an example of the stainless steel, preferred is a type having a thermal coefficient of expansion close to the ceramic ring material of rings 32, 38. The ceramic ring material is preferably aluminum nitride (AlN). Commercially pure nickel is employed the thermocompression bonds and the bond materials are at 42, 44, 46 and 48. While the bonding material between the components is shown in the form of a thin strip, initially, each may be in the form of an O-ring or O-rings interposed mechanically between the components during the bonding of the seal assemblies 12 and 14. During solid diffusion bonding, an inter-member diffusion layer is formed as at 50 between the abutting faces of the lower spacer ring 30 and the lower current collector cup 26, while a similar inter-component layer 52 is effected between the upper spacer ring 34 and the upper current collector cup 28. The seal assembly is completed in one operation using appropriate tools to support the seal components 30, 26, 42, 32, 44, 36 for seal assembly 14; and likewise the components 34, 46, 38, 48 and 40 for seal assembly 12; from the bottom of the stacked array, FIG. 1, to the top. These units are bonded as two individual seal assemblies without electrodes or separators, then assembled with electrodes and welded at 51 to finally complete the assembly of one cell. Compression force is applied in accordance with the headed arrow indicated at F, while the stacked array is subjected to heat for a suitable period of time. Processing is preferably accomplished under vacuum or appropriate inert gas environment. The cell envelope is created by welding the two seal assemblies together with a weld nugget or bead indicated at 51, welding the outer periphery of the lower flange 34B to the outer periphery of the lower cell cover ring 36. Thus, the welding of the spacer ring of the upper cell defined by seal assembly 12 to the cell cover ring 36 of the lower cell defined principally by seal assembly 14 creates one multi-cell envelope which contains the complete cell chemistry, particularly components 16, 18 and 20. The downwardly oblique lower flange of each spacer ring provides an accordion pleat effect to the assembly which helps supply the stacked pressure and at the same time allows expansion and contraction of the cell chemistry during battery cycling. This seal assembly design allows easier and more economic stackability of the seal modular unit, the use of one molybdenum current collector 28, compactness and no need for electrode locators since the electrodes fit into the corresponding seal components and steel-to-steel welding to hermetically close the cell envelope. As may be appreciated, anyone of the negative electrode separator and positive electrode may be provided with a suitable electrolyte prior to completion of the battery 10. For additional information on the nature of the makeup of batteries of this type, reference may be had to copending application Ser. No. 08/328,299, now U.S. Pat. No. 5,529,858, to Wicker et al. entitled "HERMETICALLY SEALED THERMOCOMPRESSION FEEDTHROUGHAND PERIPHERAL SEAL FOR HIGH TEMPERATURE LITHIUM BASED BATTERY APPLICATIONS", filed Oct. 24, 1994 and assigned to the common corporate assignee, and the content of which is incorporated specifically by reference herein.

The thermocompression bonding material in strip or O-ring form as at 42, 44, 46, 48 may be of aluminum or gold in lieu of nickel. Parameters for thermocompression processing including temperature, pressure and the processing environment are selected according to the materials involved in the thermocompression-bonded joint. The upper and lower ceramic rings may be formed of SiAlON ceramic. Thermocompression seals between these elements and components above and below the same with simultaneous diffusion bonding between the upper and lower current collector cups and the upper and lower spacer rings, respectively, may be effected at temperatures in the order 950° C. under a pressure of 150 kg/cm$_2$ for 60 minutes or so. Such parameters are in accordance with the referenced application Ser. No. 08/328,299, now U.S. Pat. No. 5,529,858.

Figure 2:
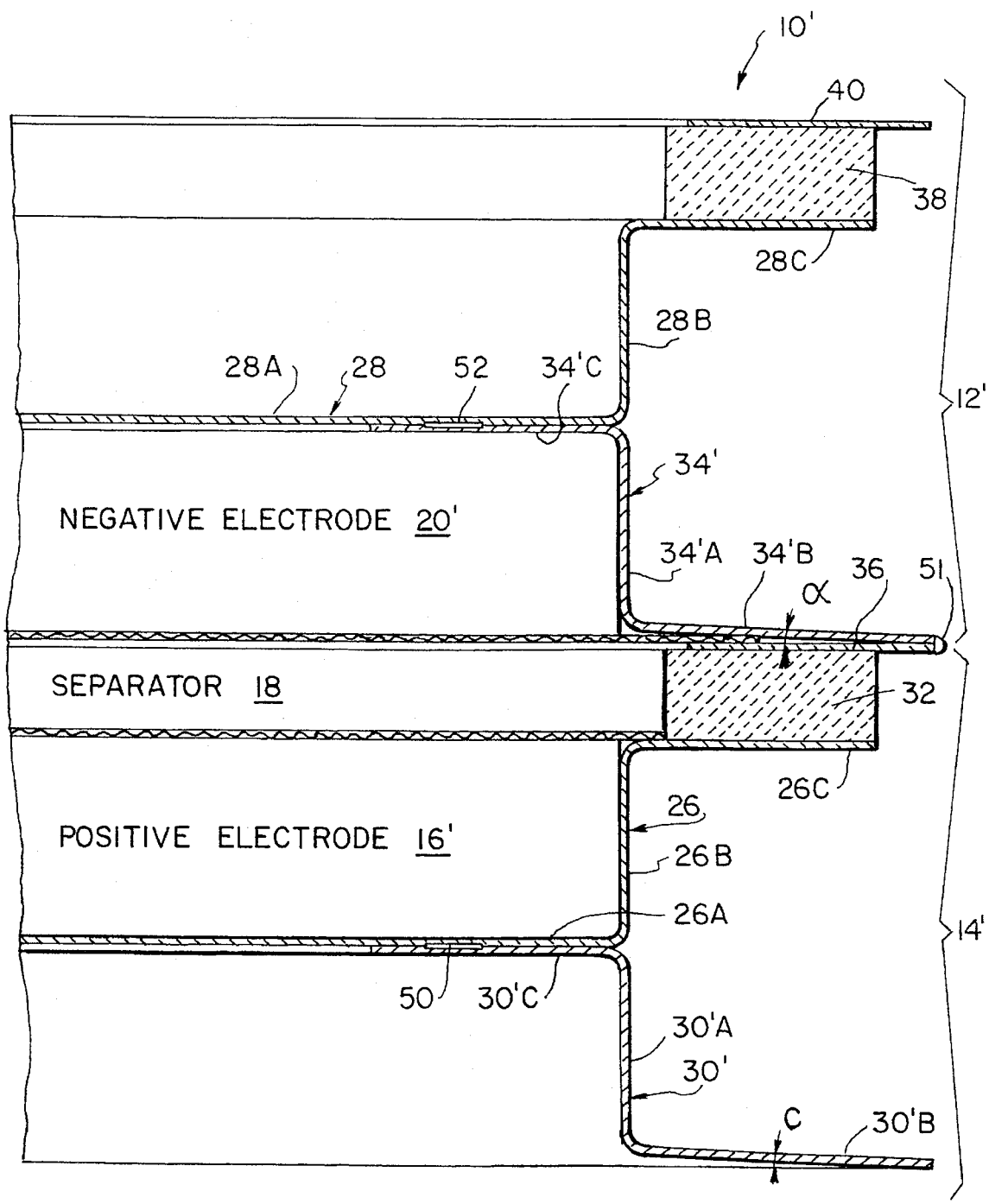
FIG. 2 is a sectional view of a portion of a bipolar multi-cell battery forming a second embodiment of the invention.

Referring next to FIG. 2, a further embodiment of the invention is illustrated which makes use of the same components as that within the first embodiment, with the exception of the upper and lower spacer rings which are of modified form and thermocompression bonded to the upper and lower current collector cups in a slightly different manner. All of the elements identical to that of the first embodiment are like numbered and will not be discussed in this description since such would be superfluous. The high temperature lithium-based battery 10' having a hermetically sealed peripheral seal includes the same number of components of each sealed assembly 12', 14' representative of each of two cells for the two-cell battery 10'. In this embodiment, instead of the lower spacer ring 30' and the upper spacer ring 34' being of C-shaped configuration and having a vertical height double that of the electrode 16' or 20' associated therewith and that of the lower and upper spacer rings 30', 34' have respectively short vertical height annular walls 30'A, 34'A, radially inward directed perpendicular flanges 30'C, 34'C and radially outwardly and downwardly directed bottom flanges 30'B and 34'B. As such, the lower and upper spacer rings do not extend to and conform nor lie against the exterior surfaces of the vertical annular walls 26B and radially outwardly directed flanges 26C of the lower current collector cup 26 and corresponding portions 28B and 28C of the upper current collector cup 28. However, similar to the first embodiment, solid diffusion bonding occurs between the radially inwardly directed flanges 30'C, 34'C of the lower spacer ring 30' and upper spacer ring 34', respectively, and the material making up cups 26 and 28.

In all other respects, the nature of assembly and completion of the stacked array, the mechanical structure itself and the peripheral seals are identical to that of the first embodiment, FIG. 1, and the same properties and capabilities exist for the completed battery 10' formed of the upper and lower cell structures.

In summary, the invention is directed to a process of making a hermetically sealed modular seal assembly for high temperature Li alloy/FeS$_x$ high temperature battery cells and multi-cell, multi-component stacked battery units. The materials are specially selected to match the high operating temperature of the system and to closely correlate the coefficient of expansion properties of the materials employed. While thermal compression is employed to join the cell metal cover ring to the insulating ceramic ring for each cell and to the metal current collector sandwiching that ceramic ring, solid metal diffusion bonding is employed to join the metal current collector to the metal C-shaped or modified C-shaped spacer rings. Both compression bonding and solid diffusion bonding can be completed in one operation using the same equipment and facilitating the cell-to-cell bonding by way of the peripheral weld 51 for each embodiment between the upper spacer ring, lower oblique flange and the lower cell cover ring.

While the invention has been disclosed by way of the preferred embodiments, it will be appreciated that various changes can be made to the disclosed embodiments without departing from the spirit and scope of the invention as defined in the appended claims.

What is claimed is:

1. A bipolar battery cell of the stacked array type comprising:

a negative electrode;

a positive electrode and a separator element disposed between said negative electrode and said positive electrode, an electrolyte within one of said positive electrode, said separator element and said negative electrode, an electrode containment structure comprising in order:

a first, flanged, upwardly open current collector cup containing and supporting said positive electrode, a first spacer ring having an annular wall and radially extending upper and lower flanges at opposite ends, at least one of said annular wall and said upper flange being diffusion bonded to the outer surface of said first upwardly open flanged current collector cup, a ceramic seal ring sized to and thermocompression bonded to the upper surface of said first upwardly open flanged current collector cup and surrounding said separator, and a first metal cell cover ring sized to and thermocompression bonded to said ceramic seal ring on a face opposite that thermocompression bond to the upper flange of said first upwardly open flanged current collector cup and completing a lower seal assembly, a second upwardly open flanged current collector cup overlying said negative electrode and having a flange thereof extending radially outwardly above the negative electrode, and a second spacer ring having an annular vertical wall sized to and in contact with the outer periphery of the negative electrode and terminating at opposite ends in upper and lower flanges, respectively, and having at least the upper flange thermocompression bonded to the outer surface of said second current collector cup, and a second ceramic seal ring sized to and thermocompression bonded to the upper flange of said upper current collector cup and a second metal cell cover ring sized to and bonded to the upper surface of said second ceramic seal ring and completing an upper cell seal assembly, and wherein said lower flanges of said first and second spacer rings extend obliquely outwardly and downwardly and are hermetically welded at the outer periphery thereof to the outer periphery of said first cell cover ring, such that the oblique lower flange of the spacer rings provide an accordion pleat effect which assist in applying the stacked pressure during completion of the two-cell battery and at the same time allowing expansion and contraction of the cell chemistry during battery charging and discharging cycling, while achieving easier and more economic stacking of the seal modular units, the use of a molybdenum current collector, the overall compactness of the battery and the elimination of electrode locators by the electrodes fitting tightly into corresponding seal components and facilitating steel-to-steel welding to hermetically close the cell envelope between cell assemblies.

2. The bipolar battery cell as claimed in claim 1, wherein the upper and lower spacer rings are of C-shaped cross-section having an annular wall sized to the outer periphery of the respective electrodes for each seal assembly, and wherein the upper and lower flanges of the spacer rings project radially outwardly from the annular wall, and wherein the annular wall is of a vertical height approximately twice the vertical height of each electrode, and wherein the solid metal diffusion bond extends over the radial width of the flange of the current collector cups.

3. A bipolar battery cell of the stacked array type as claimed in claim 1, wherein said upper and lower spacer rings are of modified C-shape, wherein the vertical annular wall is of a vertical height approximately the same as that of the electrode associated therewith, wherein the upper flange of each spacer ring extends radially inwardly from said annular wall, and said lower flange of each said spacer ring extends radially outwardly, and wherein the solid metal diffusion bond between each spacer ring and its associated current collector cup is between the upper face of the upper flange of each spacer ring and the base of a respective current collector cup.

4. The bipolar battery cell as claimed in claim 1, wherein said spacer rings are inverted flanged metal cups having bottoms facing bottoms of respective juxtaposed current collector cups, and said facing bottoms are solid metal diffusion bonded to each other thereby defining a C-shaped ring supporting structures radially exterior of said electrodes.

5. A bipolar battery cell comprising:

a negative electrode;

a positive electrode;

a separator element disposed between said negative electrode and said positive electrode, said separator element electrically insulating said electrodes from one another;

an electrolyte disposed within at least one of said negative electrode, said positive electrode and said separator element with said electrolyte in contact with both said electrodes; and an electrode containment structure comprising back-to-back flanged cup-like members encompassing respectively said positive and negative electrodes and including radially outwardly directed flanges defining high strength C-shaped spacer ring structures radially exterior of the electrodes for support and bonding to ceramic insulator rings carried by the flanges of the respective back-to-back cup-like members and peripheral ceramic seal rings electrically isolating said positive and negative electrodes.

6. The bipolar battery cell as claimed in claim 5, wherein at least one of the back-to-back flanged cup-like members includes a radially outwardly projecting flange which extends oblique away from the flange of the other cup-like member for direct peripheral welding to a juxtaposed cell cover ring whose outer periphery is sized to that of the oblique flange, thereby producing an accordion pleat effect for permitting thermal expansion and contraction of the cell chemistry during cycling and permitting the welding of individual seal assemblies associated with respective electrodes together to complete a battery multi-cell envelope.

7. The bipolar battery cell as claimed in claim 1, wherein the cell cover ring and the spacer ring formed of one material of the group consisting of stainless steel and mild steel having a close coefficient of expansion to that of the ceramic rings, and wherein said ceramic rings are formed of aluminum nitride.

8. The bipolar battery cell as claimed in claim 1, wherein the current collector cups are made of molybdenum and thermocompression bonds and utilize a nickel interface member between facing components of the stacked array.

\* \* \* \* \*